United States Patent [19]
Erwin

[11] 3,925,148
[45] Dec. 9, 1975

[54] HEAT EXCHANGERS & EVAPORATORS
[75] Inventor: Ransome W. Erwin, Ogden, Utah
[73] Assignee: Austral-Erwin Engineering Co., Houston, Tex.
[22] Filed: Dec. 27, 1974
[21] Appl. No.: 536,792

Related U.S. Application Data
[60] Division of Ser. No. 401,655, Sept. 28, 1973, which is a continuation-in-part of Ser. No. 306,183, Nov. 14, 1972, Pat. No. 3,891,496.

[52] U.S. Cl............ 159/23; 159/1 C; 159/DIG. 33; 159/1 RW; 159/28 B; 159/15; 159/31; 159/DIG. 4; 159/DIG. 13; 159/17 VS; 55/193
[51] Int. Cl.$^2$.... B01D 1/00; B01D 1/22; B03C 3/00
[58] Field of Search ....... 159/1 RW, DIG. 17, 28 R, 159/28 B, 13 R, 13 A, 15, 31, DIG. 13, 23, 17 VS, DIG. 4; 165/133, 142; 202/158, 234, 236; 203/7, 89, 100; 252/384; 55/193, 206

[56] References Cited
UNITED STATES PATENTS

| | | | |
|---|---|---|---|
| 1,997,980 | 4/1935 | Smith | 159/DIG. 17 |
| 2,579,203 | 12/1951 | Putney | 159/1 C |
| 2,903,243 | 9/1959 | Erwin | 165/108 |
| 3,050,786 | 8/1962 | St. John et al. | 165/133 |
| 3,289,754 | 12/1966 | Erb et al. | 204/25 |
| 3,298,932 | 1/1967 | Bauer | 203/11 |
| 3,323,575 | 6/1967 | Greenfield | 159/DIG. 17 |
| 3,370,636 | 2/1968 | Francis, Jr. et al. | 159/31 X |
| 3,392,089 | 7/1968 | Guptill, Jr. et al. | 159/DIG. 17 |
| 3,411,992 | 11/1968 | Mitchell | 159/DIG. 17 |
| 3,486,987 | 12/1969 | Kassel et al. | 159/DIG. 17 |
| 3,489,209 | 1/1970 | Johnson | 165/133 |
| 3,502,141 | 3/1970 | Allen | 165/133 |
| 3,563,785 | 2/1971 | Oga et al. | 159/28 R |

Primary Examiner—Jack Sofer

[57] ABSTRACT

An apparatus for evaporating aqueous solutions containing solids and/or mineral salts without adherence of such solids to any surfaces contacted by the aqueous solution, wherein all contacted surfaces are preferentially oil wettable and coated with an oily liquid, and all heated surfaces are also substantially zero water adsorbent, said apparatus comprising an outer container enclosing a confined heating and vaporizing zone, having therein heating means arranged to be externally contacted by fluids within said heating and vaporizing zone and being provided with an exterior contacting surface which is both preferentially oil wettable and substantially zero water adsorbent; a source of cold aqueous feed solution containing solids and/or dissolved mineral salts, a feed line leading from said source of aqueous solution to a portion of said confined heating and vaporizing zone adjacent to but below said heating means, means for passing oil and saturated solution to the lower portion of the confined heating and vaporizing zone, means for effecting flow of said aqueous feed solution and oil up through said heating and vaporizing zone and into contact with the exterior of said heating means, and other contacted surfaces whereby said heating means and surfaces are externally coated with oil and said aqueous feed liquid is at least partially vaporized and the vapors separated from the oily liquid and solids, upper outlet means for withdrawing hot vapor, derived from contacting said aqueous feed solution with said heating means, from the upper portion of said container, lower outlet and recycle means for withdrawing a slurry including solids, salts and oily saturated aqueous solution from the lower portion of said container for further treatment and said recycling.

20 Claims, 1 Drawing Figure

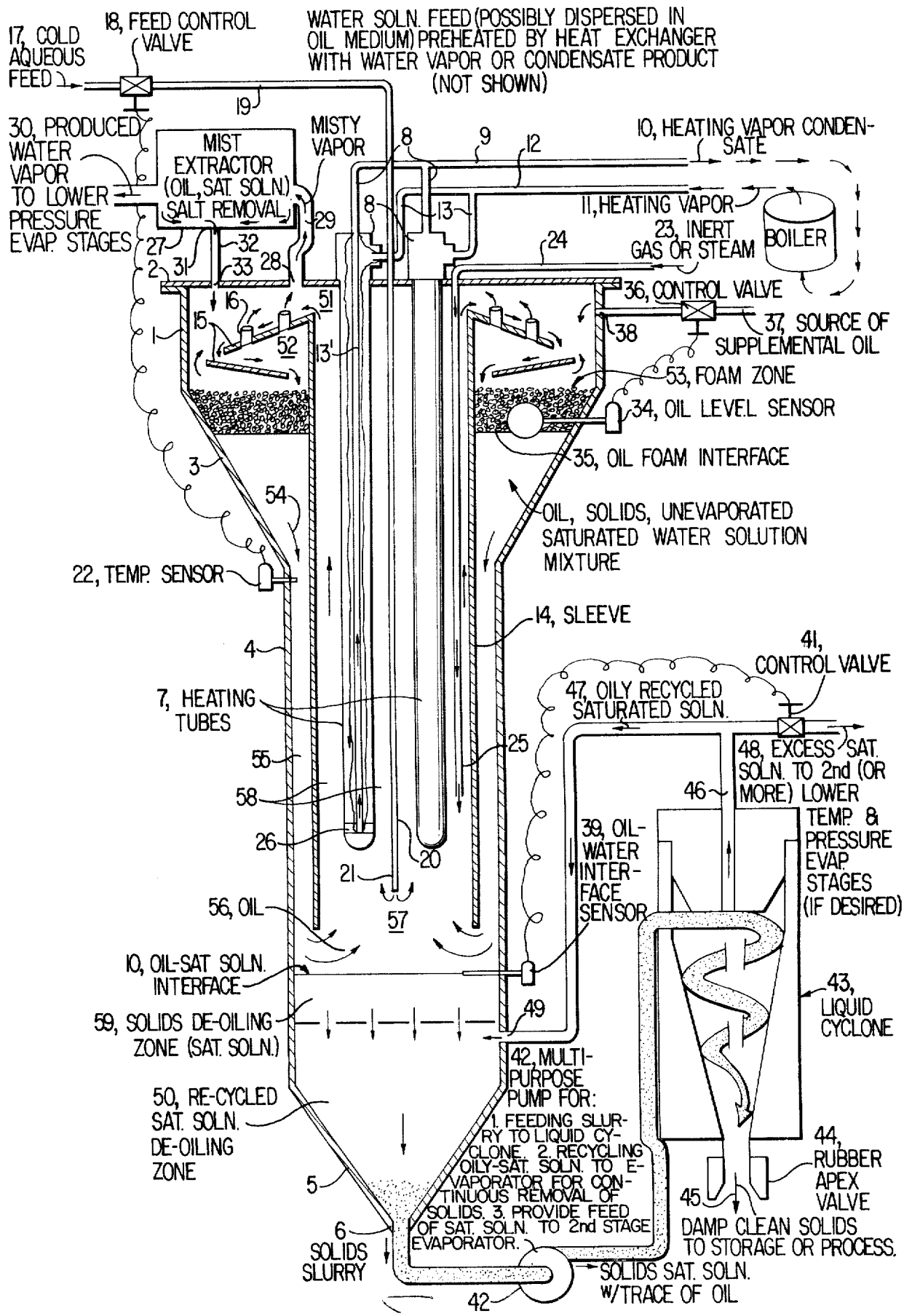

HEAT EXCHANGERS & EVAPORATORS

RELATED APPLICATION

The present application is a division of my application, Ser. No. 401,655 which is a continuation-in-part of my application Ser. No. 306,183, filed Nov. 14, 1972, entitled "IMPROVEMENTS IN HEAT EXCHANGERS AND EVAPORATOR."

BACKGROUND OF INVENTION

The transfer of heat from one fluid to another, be they liquids or gases, through a separating wall, and the evaporation of aqueous liquids, whether from a simple pot on a campfire or a most complex industrial process, probably have been as significant to Man from his earliest beginning to our present technological culture as any phenomenon. Because of its enormous scope in virtually all industrial processes, any significant improvement in heat transfer and evaporation of aqueous liquids cannot help but be of utmost importance to the environment. Such improvement is concerned with innumerable processes, some of which are: making good water from seawater and brackish water, salvaging the mineral content, if possible; converting industrial waste waters to potable water, salvaging the contaminants, if possible; converting radioactive atomic waste waters to solids which may be more readily isolated or stored in harmless areas than is possible with liquids; evaporating juices such as in the cane and beet sugar industry more efficiently with consumption of less energy for such; converting acidic mine waters to harmless solids, salvaging the water and valuable mineral content; converting brines, such as Great Salt Lake, into fresh water and valuable mineral constituents; and workable heat transfer systems to utilize steam power and recover valuable mineral contents from steam and brine produced by natural geothermal wells. In all of the aforementioned processes, the fouling of heat transfer surfaces and surfaces of confining vessels and the prevention thereof is astronomical in cost in manpower, maintenance, downtime, and low energy efficiency. This invention offers a novel, practicable means and method for prevention of such surface contamination without need of expensive and elaborate chemical treatment, together with novel means and methods for handling and separation of difficult mixtures of solids, liquids and gases.

In my U.S. Pat. No. 2,903,243, granted Sept. 8, 1959, is disclosed my discovery that precoating a heating element with a preferentially oil wettable material such as a silicone, epoxy resin, or phenolic resin prevented the adherence of insoluble calcium carbonate and other precipitates to the element when heating a mixture of crude petroleum and mineralized water, wherein the element was continuously exposed to an oil wash. Even though these coating materials proved fully effective in scale prevention at relatively high temperatures where no boiling occurred in heat treating crude petroleum emulsions, I later learned they would not apply to systems boiling mineralized waters. I also learned years later that the reason the abovementioned coating materials would not prevent scaling at boiling temperatures was because they adsorb water after prolonged contact with it, and become water wettable and susceptible to solids adherence. This is very prevalent when saturation is reached, and soluble salts are precipitated. Most industrial plastics such as epoxy resins, phenolic resins, polyethylene, neoprene, and the silicones are generally regarded as being preferentially oil wettable, but since they all adsorb traces of water upon prolonged contact with it, they eventually become oil repellant when immersed in a water environment, becoming water wettable and subject to solids adherence. Although I am not familiar with all industrial plastics, I have found only the fluorocarbon resins such as DuPont's Teflon to be substantially zero water adsorbent and permanently water repellant when immersed in water indefinitely. In view of the foregoing, I have discovered that zero water adsorbent coatings such as the fluorocarbons, particularly DuPont's 'hexafluoropropylenetetrafluoreothylene' with the tradename FEP, retain their preferentially oil wettable properties in indefinite contact with boiling brines, and that their wetting with oil effectively prevents adherence of any precipitated salts to their surface. I also tried similar tests, using an oil wash, with phenolic resin and epoxy resin coated heating tubes and found that salt growth on them to be quite rapid, as much as ½ inch salt thickness on a 1 inch diameter tube in 8 hours boiling of brine. FEP coated heating elements also salted up in boiling brine when no oil was present in the system. The teaching in my U.S. Pat. No. 2,903,243 and other patent art to the present time, and in technical literature in general, is not sufficient to enable technicians to boil brines or mineralized waters without scaling, even though the so-called preferentially oil-wettable materials listed in U.S. Pat. No. 2,903,243 and used with oil. If it were so, this means would have been employed years ago to cope with this very serious problem. Only in comparatively recent work, embodied in this and companion applications, have I discovered that the vital key is the use of substantially zero water adsorbent coatings, rather than the general run of temporarily oil wettable coatings. A chief discouraging factor in the use of fluorocarbon coatings on metallic heat exchanger tubes has been the prohibitive cost and difficulties in achieving good, permanent coatings; so difficult that industrial coaters shy away from doing such. Pure, small diameter, comparatively thick walled (10 mils) bundles of teflon tubes are in use for corrosive fluids, but they do not teach the use of oil films with them to prevent fouling. A metallic thin walled tube with a very thin coating of fluorocarbon (range of 0.5 to 2 mil thickness) is best for efficient heat transfer. Because of urgent need for such a tube to effect the method disclosed in this application and companion applications, I have perfected an economical means of heat bonding a coating of DuPont FEP to a metal surface which is strongly bonded and substantially permanently zero water adsorbent, and suitably thin. This method is the substance of my pending application Ser. No. 311,137 filed Dec. 1, 1972 which is a 'continuation of my earlier application filed May 28, 1970, Ser. No. 41,375. I believe the novel disclosures of new and important uses for the basic methods described in U.S. Pat. No. 2,903,243 in this application, together with my discovery that substantially zero water adsorbent materials are essential to boiling of mineralized waters, are distinct and major improvements over the teaching of U.S. Pat. No. 2,903,243. I further believe that they will prove to be vital elements in solving some of the presently unsolved very serious problems in a broad spectrum of industry.

Objects of this Invention are as folows: Provision of method and apparatus to:

1. Exchange heat between two fluid systems through a permanently oil wettable wall without deposition of solids on the wall, wherein one of the fluids is, substantially, a mixture of oil and aqueous solution, and the other fluid may be liquid or gas or both, containing oil if solids are present.

2. Evaporate waters containing dissolved and/or suspended solids to any desired extent including total dryness; recovering both the solids and water vapor or only either, if desirable; all, without fouling of the heating and evaporating system with mineral scale or solids.

3. Accomplish objects (1) and (2) without chemical treatment to prevent fouling of heat transfer surfaces.

4. To convey or circulate liquids containing dissolved or suspended solids without depositon of solids on the contacting surfaces.

5. To heat, cool or evaporate extremely corrosive liquids, acidic or alkaline, in objects (1) and (2).

6. To accomplish object (2) in multi-stage or vapor compression distillation if required.

7. Provide a novel, permanently oil wettable heat exchanger tube design wherein a vertically disposed tube is attached to the exchanger header at one end only, permitting uninhibited thermal expansion when heated; avoiding sedimentation common to horizontally disposed heat exchangers and vertical heat exchangers with conventional headers at each end of the tubes; permitting simple removal of the tube bundle from the top of the heating vessel without drainage of the vessel. Further to provide an inner return condensate tube inside the heat exchanger tube with a unique arrangement of sizing that permits complete and continuous removal of liquid condensate from the lower portion of the heat exchanger tube with a negligible loss of vapor.

8. Enhance heat transfer and stimulate liquid circulation by the method of injecting inert gas or steam into the heat transfer zone outside the heating tube, wherein the injected gas increases the flow velocity of the circulating liquid and disrupts stagnant, insulating films on the heater tube, increasing heat transfer rate as much as 80 percent.

9. Prevent salt buildup in and seizing of pump with water wettable interiors when circulating oil is contaminated with salts and brine, by injection of fresh water into the oil stream to the pump suction in amounts as small as one part of water to 3000 parts of oil; thus avoiding the need for a very expensive step of complete cleansing of the oil prior to pumping, or the alternative of permanently oil wettable interiors for the pump. (Such pump being disclosed in my application Ser. No. 306,183, but omitted here).

10. Feed and aqueous solution (brine etc.) to a circulating hot oil as a highly dispersed mixture composed of the solution and oil from a cooler part of the system, this mixture being effected by a mixing pump (disclosed in Ser. No. 306,183, but omitted here); with oil being the continuous phase of the mixture in order to facilitate complete mixing with the circulating hot oil when combined with it, which, in turn, provides thorough dispersion of the solution droplets throughout the hot circulating oil without having to subject the hot circulating oil to mixing with the aqueous solution in a pump; the purpose of the whole procedure being to vaporize the solution droplets by intimate contact with the hot oil.

11. Assure oil wettable surfaces for all interior areas contacting the fluids being evaporated or circulated, using substantially zero water adsorbent materials (such as fluorocarbon resins) on heating surfaces, heater chamber interior, cascading baffles, and interior of flashing chamber; and lesser oil-wettable materials such as neoprene for interiors of a hot oil-aqueous solution mixing chamber, and conduits between the evaporator tank and the heating chamber; also using substantially zero water adsorbent surfaces contacting the solids slurry throughout its flowsheet.

12. Prevent solids crystalline growth on roughened surfaces or sharp edges, even though permanently oil-wettable, by complete elimination of such surfaces or edges from the hot oil-aqueous solution mixing zone to the solids slurry settling zone in the flashing cascading chamber.

13. Assure abundant surface exposure of liquid-vapor-solids mixture in the cascading chamber by cascading it downward over any of a variety of sloping baffles which are preferentially oil wettable, and which contain no sharp edges or rough surface; which, further, permit removal of released vapors through their ends without recontacting them with the falling liquid.

14. Automatically and separately remove produced solids slurry and unevaporated aqueous solution as they accumulate.

15. Recycle a portion of the unevaporated aqueous solution, if required, admitting sufficient oil with the solution to prevent solids deposition on the preferentially oil wettable interiors of the pump and conduit for its recycling.

16. Convey the unevaporated aqueous solution remainder, if required, to a 2nd stage evaporator, injecting sufficient hot oil from this 2nd stage (if required, but not shown) into the solution as it leaves the 1st stage to prevent solids deposition on all conduit and controls interiors which are preferentially oil wettable.

17. Remove mist of entrained oil, solids and aqueous solutions from the vapor in a scrubber which contains no rough surfaces or sharp edges, and which is preferentially oil wettable.

18. Effect multi-stage distillation of aqueous solutions with sufficient control to permit separation of salts into various components in certain mineralized systems.

19. Convey heat from a remote, and possibly dilute, source by circulating oil through a source to adsorb heat, returning it to be mixed with aqueous solution for evaporation as herein disclosed; some of such heat sources being for example geothermal wells, sub-surface terrestrial formations, and solar heat absorption devices. Should the heated oil temperatures be below atmospheric pressure evaporation temperatures, sub-atmospheric pressures could be employed to effect evaporation using the aforedescribed methods as depicted in application Ser. No. 306,183, such being adaptable to this disclosure, though not shown.

20. Utilize an oil type liquid for the multi-purpose of conveying heat to an aqueous solution to be evaporated, wet the preferentially oil wettable surfaces of the confining system with a film to prevent adherence of solids and act as a vehicle to convey the suspended solids to a suitable settling and separation zone.

21. Separate a solids slurry into a saturated solution (for return to the system to be re-cycled, sending the excess to a 2nd stage evaporator) and a damp solids product, using inherent oil in the system of separation and handling to prevent adherence of solids to the preferentially oil wettable contacting surfaces.

22. Pre-heat the incoming raw aqueous solution, which may be dispersed in an oil medium, with hot condensate product in a preferentially oil wettable heat exchanger referred to in FIG. 1 of this application, but not shown as such, since its use and arrangement would suggest itself to one skilled in the art. Note: The preceding 22 listed Objects of Invention are almost identical to those listed in my application Ser. No. 306,183, whereas, the following additional Objects are solely pertinent to this new disclosure.

23. Combine the heating chamber, mixing chamber, and vaporizing-settling chamber, depicted as three separate vessels in Ser. No. 306,183, into interconnected chambers in a single vessel.

24. Use inert gas, preferably nitrogen or steam, together with produced steam to effect the required liquid circulation throughout the three chambers.

25. Recycle saturated solution to and from the bottom of the evaporator vessel in order to continuously remove precipitated solids thereby preventing any sedimentation or caking hereof.

26. Provide a quiet saturated solution wash zone to remove most of the oil film from the produced solids.

27. Employ a single pump for three important functions:

a. Circulate saturated solutions with sufficient volume and velocity to effectively remove all solids as they settle in the bottom of the evaporator.

b. Provide adequate feed pressure and volume of slurry to enable a liquid cyclone liquid-solids separator to function efficiently and properly.

c. Provide pressure to convey the excess saturated solution to a 2nd stage evaporator.

DESCRIPTION OF THE INVENTION

This apparatus and method, a continuation-in-part of Ser. No. 306,183 filed Nov. 14, 1972, is an improvement over a novel approach to the evaporation of both saturated and unsaturated aqueous systems to any desired extent, including dryness. The water in the aqueous system may contain both dissolved and suspended solids, or only one or the other. Evaporation is effected without depositing any solids on any of the interior surfaces.

The invention will be more readily understood by reference to the accompanying drawing and the following detailed description, together with direct reference to the drawings and detailed description included in my application Ser. No. 306,183;

FIG. 1 (the only drawing) is schematic, depicting the evaporator with salient details of its novel internal components, location of sensor controls, location of various levels and interface. of liquid contact between oily and watery components, together with a flow scheme of all fluids and solids into and out of the evaporator; also depicting schematic pumping arrangement with a liquid cyclone liquid-solids separator, and a schematic, separate mist extractor to remove entrained liquids and solids from the produced water vapor. The numerically identified details of the structure and flow patterns in FIG. 1 are as follows:

1. is the upper enlarged portion of the evaporator shell and chamber;
2. is the evaporator cover or lid, pierced by the heating tubes, shown here individually, but in actual practice a tube bundle with suitable tubing headers (familiar to those skilled in the art);
3. Large sloping cone wall of evaporator;
4. Lower smaller diameter section of evaporator shell.
5. Cone bottom of the evaporator shell.
6. Bottom outlet from the evaporator.
7. Two typical heating tubes, attached at upper end only.
8. Inner tube for heating tube 7 for heating-vapor condensate removal.
8'. Connection Tee for 7 and 8 assembly.
9. Heating-vapor condensate removal conduit.
10. Condensate return to boiler (not shown)
11. Source of heating-vapor (boiler not shown)
12. Heating-vapor conduit to evaporator.
13. Individual vapor inlet conduits.
13'. Annular space between inner tube 8 and heating tube 7.
14. Open both-ends sleeve conduit for housing the heating tubes.
15. Sloping baffles for vapor release in the vapor chamber.
16. Vapor vent pipes in baffles 15
17. Source of pre-heated aqueous solution feed.
18. Solution feed control valve, actuated by temperature sensor 22.
19. Aqueous solution feed conduit to evaporator.
20. Aqueous solution feed conduit inside evaporator.
21. Discharge outlet of conduit 20.
22. Temperature sensor to activate feed valve 18.
23. Source of inert gas (nitrogen or steam) for circulation stimulation.
24. Conduit for 23.
25. Outlet and injection zone for 23
26. Heating-vapor condensate accumulation zone prior to discharge through 8.
27. Schematic mist extractor for removal of entrained oil, solids and saturated water solution from produced water vapor.
28. Produced vapor discharge from the evaporator.
29. Conduit for 28 to mist extractor 27.
30. Clean vapor outlet from mist extractor 27.
31. Oil, solids and saturated water solution exit from 27
32. Return conduit to evaporator for 31.
33. Entry to evaporator for 32.
34. Evaporator oil level sensor to actuate oil feed valve 36.
35. Oil level and foam interface.
36. Supplemental oil feed control valve.
37. Source of supplemental oil feed. (detail not shown)
38. Entry of 37 to evaporator.
39. Oil-water interface sensor to actuate feed valve 41 to second stage evaporator.
40. Oil-saturated water solution interface.
41. Control feed valve for excess saturated water solution to second or more stages of evaporation, actuated by sensor 39.
42. Multi-purpose pump for:
   a. feeding oily solids-saturated water solution slurry to liquid cyclone;
   b. re-cycling oily saturated water solution to the evaporator to facilitate continuous removal of precipitated solids;
   c. effecting forced feed of excess oily saturated water solution to a second stage evaporator;
43. Liquid cyclone for removal of solids from the slurry.
44. Apex valve for discharge of damp solids from 43.

45. Clean, damp solids to storage or further processing.
46. Oily saturated solution, solids free, from liquid cyclone.
47. Re-cycle conduit for circulated oily saturated water solution return to evaporator.
48. Conduit for excess oily saturated water solution to second stage evaporator.
49. Entry zone for re-cycled oily saturated water solution returned to lower portion of the evaporator.
50. Bottom stratum of oily saturated water solution, where re-cycled solution mixes with downcoming precipitated solids.
51. Discharge overflow zone for mixture of oil, water vapor, solids, and water solution flowing from the combination heating, mixing and evaporating zone in conduit sleeve 14 which also encompasses the heating tube bundle.
52. Vapor zone between baffles 15.
53. Foam zone in enlarged evaporator shell 1.
54. Downward flow path of mixture of oil, solids, and unevaporated saturated water solution from upper enlarged chamber 1 to lower annular space 55.
55. Annular space for downward flow path of oil, solids etc between outer shell 4 and sleeve 14.
56. Settling and change-of-direction-for-oil zone to facilitate removal of solids and unevaporated saturated solution from the partially cooled oil prior to its recycling and heating and mixing with water solution in sleeve 14.
57. Entry and mixing zone for re-cycled oil and incoming aqueous solution (dispersed in oil, if required).
58. Heating space between heating tubes 7, also upflowing path for oil and aqueous solution to be mixed and heated, together with inert gas if required for circulation stimulation.
59. Water medium stratum, saturated solution zone for partial de-oiling of solids.

OPERATION

The flow scheme for various fluid and solids components in the system is as follows: Any water feed solution to be totally or partially evaporated, preheated or not, mixed as a dispersion in an oily medium or not, flows from source 17 through feed control valve 18 through conduits 19 and 20 to discharge at 21 and be mixed with upward circulating oil in zone 57 and the flow path upward between the heating tubes 7. Feed control valve 18 is actuated by temperature sensor 22 to maintain a certain temperature range in the cooled, downward moving circulating oil returning to the heating-mixing zone in conduit 14 -- if the temperature drops, the aqueous feed solution rate is reduced and vice versa. The mixture of circulating oil and watery feed solution moves upward between the heating tubes 7 inside sleeve 14, the propelling lift force deriving from steam produced by evaporation of the aqueous solution and supplemented by injection of an inert gas such as nitrogen or steam from conduit 24 entering at conduit outlet 25. As the mixture of oil, watery feed solution and inert gas moves upward, it is heated to vaporizing temperatures of the watery solution, but always less than that of the oil medium. Thus a mixture of hot oil, precipitated solids, water vapor and finely dispersed remaining droplets of watery solution overflows the top of sleeve 14 at zone 51, where the mixture flashes off the vapor as it flows downward over baffles 15, further vaporizing the small droplets. This vaporization is completed in enlarged chamber L 1 when a temperature balance is reached between the entrained solution droplets and the oil medium, the vapor coming off as foam in foam section 53. As fully described in my Application Ser. No. 306,183, all interior surfaces of this system should be coated with a preferentially oil wettable coating, preferably zero water adsorbent, and contain no rough or sharp edges or surfaces, all aimed at preventing the adherence of solids to the exposed surfaces. Vent pipes 16 in baffles 15 are shown as possible means to permit upward passage of water vapors from lower baffle members without countercurrent interference with downward moving streams of liquids over the lower edges of the baffles 15. The mixture of oil, solids, and any remaining unevaporated saturated water solution, considerably cooled by previous evaporation of water, passes down into zone 54 and on to annular path 55 between outer shell 4 and inner conduit sleeve 14. When the mixture reaches zone 56, it is halted, the oil changing directions and moving upward to zone 57 at the lower entrance into sleeve 14, and the solids and remaining saturated solution dropping on down to zone 59. Most of the oil film on the solids is released in zone 59, this removed oil rejoining the oil in zone 56, the solids and unevaporated portion of saturated solution (if any) then passing to zone 50 where they are mixed with circulating oily saturated solution entering at inlet 49. This circulating oily saturated solution acts as a vehicle to convey the solids from the cone bottom of the evaporator as a slurry, with no sedimentation of solids, through outlet 6 to pump 42. Pump 42 applies sufficient pressure and volume rate to the slurry to effect efficient, clean and damp solids separation from the saturated solution in liquid cyclone 43. The solids leave the cyclone through apex valve 44 to any desired destination 45. The removed oily saturated solution leaves the liquid cyclone at 46, a portion returning through conduit 47 to inlet 49 of the evaporator vessel to be re-mixed with new solids, and the other portion passing through control valve 41 to destination 48, a 2nd stage evaporator, not shown. Control feed valve 41 is actuated by oil-water interface sensor 39 to maintain a fairly constant oil-water interface level 40.

Produced water vapor from upper chamber 1 passes out through outlet 28 through conduit 29 to mist extractor 27. Here the entrained oil, solids, and saturated solution droplets are removed and returned by gravity through outlet 31 and conduit 32 to the evaporator vapor chamber 1. The clean water vapor leaves the mist extractor at 30 to be condensed in heat exchangers (not shown) or re-used for heat salvage in a lower pressure-lower temperature 2nd stage of evaporation.

Make-up or supplemental oil (not shown) from 37 is returned to the evaporator through control valve 36 entering the evaporator at 38. This control valve 36 is actuated by level sensor 34 by oil level 35, and is arranged to admit oil only after a considerable drop in the oil level, so as to not be influenced by fluctuations in interface level 40 as it responds to sensor 39 actuating feed valve 41. Actually, the only oil loss should be the trace of entrained oil leaving with the excess saturated solution through controlled outlet valve 41 to a 2nd stage evaporator. This oil loss may be salvaged from the 2nd stage evaporator and returned as a dispersion mixture at feed source 17. These details are depicted in the drawings in my Ser. No. 306,183.

Heat for the system as depicted in FIG. 1 is provided by hot condensing vapors (water, Dow-therm etc.) in the annular space 13' between heating tubes 7 and inner condensate exhaust tubes 8. The vapor comes from source 11 (boiler not shown) through conduit 12 to enter the annular space 13' through individual conduits 13, entering through Tee 8'. In actual large scale operations, this would be a conventional tubing header, not shown as it is familiar to those skilled in the art. The condensate forms, trickles down the interior of tube 7, accumulates only at zone 26 and is exhausted through inner tube 8 to conduit 9 and back to heat source at 10. The novelty, theory and advantages of this special single-ended heating tube is fully described and claimed in my Ser. No. 306,183.

ADVANTAGES OF INVENTION

This invention has, essentially, the same advantages listed in my application Ser. No. 306,183, together with the following advantages that appear to be unique to it:

1. It is much simpler and more economical in construction, since the three important functions of heating, boiling and settling, and cascading vapor removal are now housed in a single vessel, in contrast to the three vessels depicted in Ser. No. 306,183.
2. The system requires less pumps, controls and interconnecting conduits.
3. It has only one settling zone for settling of solids, or where solids may inadvertently settle out, these being constantly removed by the unique circulation-flushing arrangement of saturated solution, thereby fully eliminating sedimentation.
4. Continuous removal of solids as a slurry to a liquid-cyclone, employing a control valve on solids-free liquid only, eliminates the need for a control valve to function with slurries with its attendantswear and operational problems.
5. Minimizes heat losses, requiring less vessel insulation, by combining the several important functions into one vessel, with the combination heating and mixing chamber located centrally in the vessel where heat losses from it are recovered by the surrounding re-cycled liquids.
6. Eliminates serious problems inherent in circulating, by pump, large volumes of hot, solids-contaminated oil which may also contain an appreciable amount of entrained saturated solution capable of scaling up pump interiors that are not preferentially oil wettable.
7. This compact vertical tube evaporator lends itself very readily for installation in the deck or dome of storage tanks such as those used for radio-active waste water liquids, permitting much needed conversion of such liquids to solids, leaving the solids in place in the tank for permanent storage thereby minimizing or completely preventing their loss in event of future failure of the storage tank.

What is claimed is:

1. An apparatus for evaporating aqueous solutions containing solids and/or mineral salts without adherence of such solids to any surfaces contacted by the aqueous solution, wherein all contacted surfaces are preferentially oil wettable and coated with an oily liquid, and all heated surfaces are also substantially zero water adsorbent, said apparatus comprising an outer container enclosing a confined heating and vaporizing zone, having therein heating means arranged to be externally contacted by fluids within said heating and vaporizing zone and being provided with an exterior contacting surface which is both preferentially oil wettable and substantially zero water adsorbent; a source of cold aqueous feed solution containing solids and/or dissolved mineral salts, a feed line leading from said source of aqueous solution to a portion of said confined heating and vaporizing zone adjacent to but below said heating means, means for passing oil and saturated solution to the lower portion of the confined heating and vaporizing zone, means for effecting flow of said aqueous feed solution and oil up through said heating and vaporizing zone and into contact with the exterior of said heating means, and other contacted surfaces whereby said heating means and surfaces are externally coated with oil and said aqueous feed liquid is at least partially vaporized and the vapors separated from the oily liquid and solids, upper outlet means for withdrawing hot vapor, derived from contacting said aqueous feed solution with said heating means, from the upper portion of said container, lower outlet and recycle means for withdrawing a slurry including solids, salts and oily saturated aqueous solution from the lower portion of said container for further treatment and said recycling.

2. An apparatus as defined in claim 1 wherein the outer container comprises an elongated upright vessel and said heating means comprises a heat exchange tube, extending downwardly from the top of the vessel but terminating short of the bottom thereof, through said heating and vaporizing zone in heat exchange relation to fluids within said heating and vaporizing zone, means for passing a condensible heating fluid in vapor form downward through said tube, to supply heat to the fluids surrounding said tube and means for withdrawing vapor condensate from the upper portion of said tube.

3. An apparatus as defined in claim 1 wherein the lower portion of said outer container is in the form of a downwardly convergent cone.

4. An apparatus as defined in claim 1 wherein the outer container comprises an upright vessel and said heating means extends downwardly into said vessel from the top thereof and terminates short of the bottom of the vessel.

5. An apparatus as defined in claim 4 wherein the upright vessel houses successive separating zones including (1) an upper zone for misty aqueous vapors, (2) an oil zone for saturated aqueous solution and solids contaiminated oil, (3) a zone for oily aqueous solution and solids, and (4) a lower zone for aqueous solution solids slurry containing a trace of oil, said successive zones being arranged in downwardly descending order according to the specific gravity of the fluids contained therein, and lightest being at the top and the heaviest at the bottom.

6. An apparatus as defined in claim 4 wherein the upper portion of the vessel includes an upper zone for hot vapors, a foam zone below the vapor zone and an external vapor discharge line leading from the upper zone for hot vapors.

7. An apparatus as defined in claim 6 wherein a mist extractor is included in said hot vapor discharge line.

8. An apparatus as defined in claim 6 wherein the upper portion of the vessel is enlarged upwardly and outwardly from the remaining portion and includes an upper zone for hot vapors, a foam zone below the vapor zone and an external vapor discharge line leading from the upper zone for hot vapor.

11

9. An apparatus as set forth in claim 6 wherein the vapor zone includes zig-zag cascade type baffles.

10. An apparatus as defined in claim 1 in which the lower outlet and recycle means includes pump means located downstream from the container of the evaporating apparatus to aid in the withdrawal of slurry from the container and apply pressure to the withdrawn fluid.

11. An apparatus as defined in claim 10 wherein the lower outlet and recycle means includes liquid-solids separating means located downstream from the pump means.

12. An apparatus as defined in claim 11 wherein the liquid-solids separator is provided with means for returning a portion at least of the separated liquid to the lower portion of the outer container of said evaporating apparatus for said recycling.

13. An apparatus as defined in claim 12 wherein said liquid-solids separating means is provided with means for passing a portion of the separated liquid to a further stage of evaporation.

14. An apparatus as defined in claim 1 wherein the substantially zero water adsorbent surfaces comprises fluorocarbon polymers.

15. An apparatus as defined in claim 14 wherein the fluorocarbon polymers comprise FEP.

16. An apparatus as defined in claim 14 wherein the fluorocarbon polymers comprise hexafluoropropyleneteterafluoroethylene.

17. An apparatus for evaporating aqueous solutions containing solids and/or mineral salts without substantial adherence of such solids to surfaces contacted by the aqueous solution, wherein all contacted surfaces are preferentially oil wettable and coated with an oily liquid and all heated surfaces are also substantially zero water adsorbent; said apparatus comprising an outer container enclosing a confined heating and vaporizing zone, heating means therein arranged to be externally contacted by fluids within said heating and vaporizing zone and being provided with an external contacting surface which is both preferentially oil wettable and substantially zero water adsorbent; said outer container comprising a fluid tight, upright tubular vessel enlarged upwardly and outwardly at its upper portion to include an upper vapor zone with baffles therein and a foam zone below the vapor zone, the lower portion of said vessel being cone shaped and terminating in an outlet for a slurry of solids in oily mineral saturated aqueous solution; an inner cylindrical sleeve separating the heater means from the outer vessel, located within said outer vessel and substantially concentric therewith, said sleeve extending through the heating and vaporizing zone but terminating short of the ends of the outer vessel and enclosing said heating means, said sleeve having a lower inlet for re-cycled oil type of fluids to be heated and mixed with aqueous solution which is evaporated by said heater and an upper outlet for the heat treated fluids, including vapors and residual liquids and solids, said outlet opening into said vapor zone, upper perforated downwardly and outwardly sloping baffle means within said vapor zone at the outlet end of said sleeve, to receive the mixture of oil and unvaporized fluid comprising an outer liquid containing solids from said outlet and to remove residual vapors therefrom and lower downwardly and inwardly sloping baffle means cooperating with said upper baffle means arranged to receive the unvaporized product from said upper baffle means; and deliver it to the foam zone; a source of cold aqueous feed solution containing solids and/or dissolved mineral salts, a feed line from said source of aqueous solution discharging into the inlet of said sleeve, passageway means for recycling of oil type liquid removed from the lower most portion of the container to said inlet of said inner sleeve, means for effecting flow of said aqueous feed solution and recycled oil type of liquid through said sleeve and into contact with the exterior of said heating means, whereby aqueous feed liquid is at least partially vaporized and separated from the oily liquid and solids, upper outlet means in the top of said container above the vapor zone permitting removal of hot vapor, derived from contacting said aqueous feed solution and oily liquid with said heating means, from said container, lower outlet means for withdrawing a slurry including solids, salts and oily saturated water solution from the cone shaped lower portion of said outer vessel for further treatment and said recycling, liquid-solids separating means for separating solids from said slurry, means for returning a portion at least of the separated oily saturated water solution to the lower portion of the outer container for said recycling, and means for supplying supplemental oil type liquid as required.

18. An apparatus as defined in claim 17 wherein the substantially water adsorbent contacted surfaces comprise fluorocarbon polymers.

19. An apparatus as defined in claim 18 wherein the fluorocarbon polymers comprise FEP.

20. An apparatus as defined in claim 18 wherein the fluorocarbon polymers comprise hexafluoropropyleneteterafluoroethylene.

* * * * *